US012624953B2

(12) United States Patent
Bai et al.

(10) Patent No.: US 12,624,953 B2
(45) Date of Patent: May 12, 2026

(54) METHOD AND SYSTEM OF LANE-LEVEL ROAD CONGESTION IDENTIFICATION AND FORECASTING FOR NAVIGATION APPLICATION

(71) Applicant: GM Global Technology Operations LLC, Detroit, MI (US)

(72) Inventors: Fan Bai, Ann Arbor, MI (US); Michael Wahlstrom, Wolverine Lake, MI (US); Donald K. Grimm, Utica, MI (US); Paul E. Krajewski, Troy, MI (US); Richard Gordon, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 326 days.

(21) Appl. No.: 18/359,979

(22) Filed: Jul. 27, 2023

(65) Prior Publication Data
US 2025/0035449 A1 Jan. 30, 2025

(51) Int. Cl.
*G01C 21/34* (2006.01)

(52) U.S. Cl.
CPC ..... *G01C 21/3415* (2013.01); *G01C 21/3461* (2013.01); *G01C 21/3492* (2013.01)

(58) Field of Classification Search
None
See application file for complete search history.

(56) References Cited

U.S. PATENT DOCUMENTS

| | | | |
|---|---|---|---|
| 9,672,734 B1 | 6/2017 | Ratnasingam | |
| 2015/0345967 A1* | 12/2015 | Meuleau | G01C 21/3453 701/25 |
| 2018/0182238 A1* | 6/2018 | Fowe | G08G 1/0112 |
| 2020/0035092 A1 | 1/2020 | Rajab et al. | |
| 2022/0276653 A1* | 9/2022 | Wray | G05D 1/0214 |
| 2023/0243661 A1* | 8/2023 | Huang | G01C 21/3461 701/482 |

OTHER PUBLICATIONS

El Joubari et al., "Markov Chain Mobility Model for Multi-lane Highways", Mobile Networks and Applications, Feb. 21, 2022, p. 1286-1298, vol. 27. United States.

* cited by examiner

*Primary Examiner* — Hongye Liang
(74) *Attorney, Agent, or Firm* — Vivacqua Crane, PLLC

(57) ABSTRACT

A method for lane-level road congestion identification and forecasting includes identifying lane-level road congestion using Gaussian mixture modeling, predicting lane-level road congestion using a 2D Markov chain, and identifying routes and route changes for a host vehicle and applying the route and route changes to improve a host vehicle estimated time of arrival (ETA) at a predetermined finish location such that the ETA is shorter than a predetermined threshold.

18 Claims, 8 Drawing Sheets

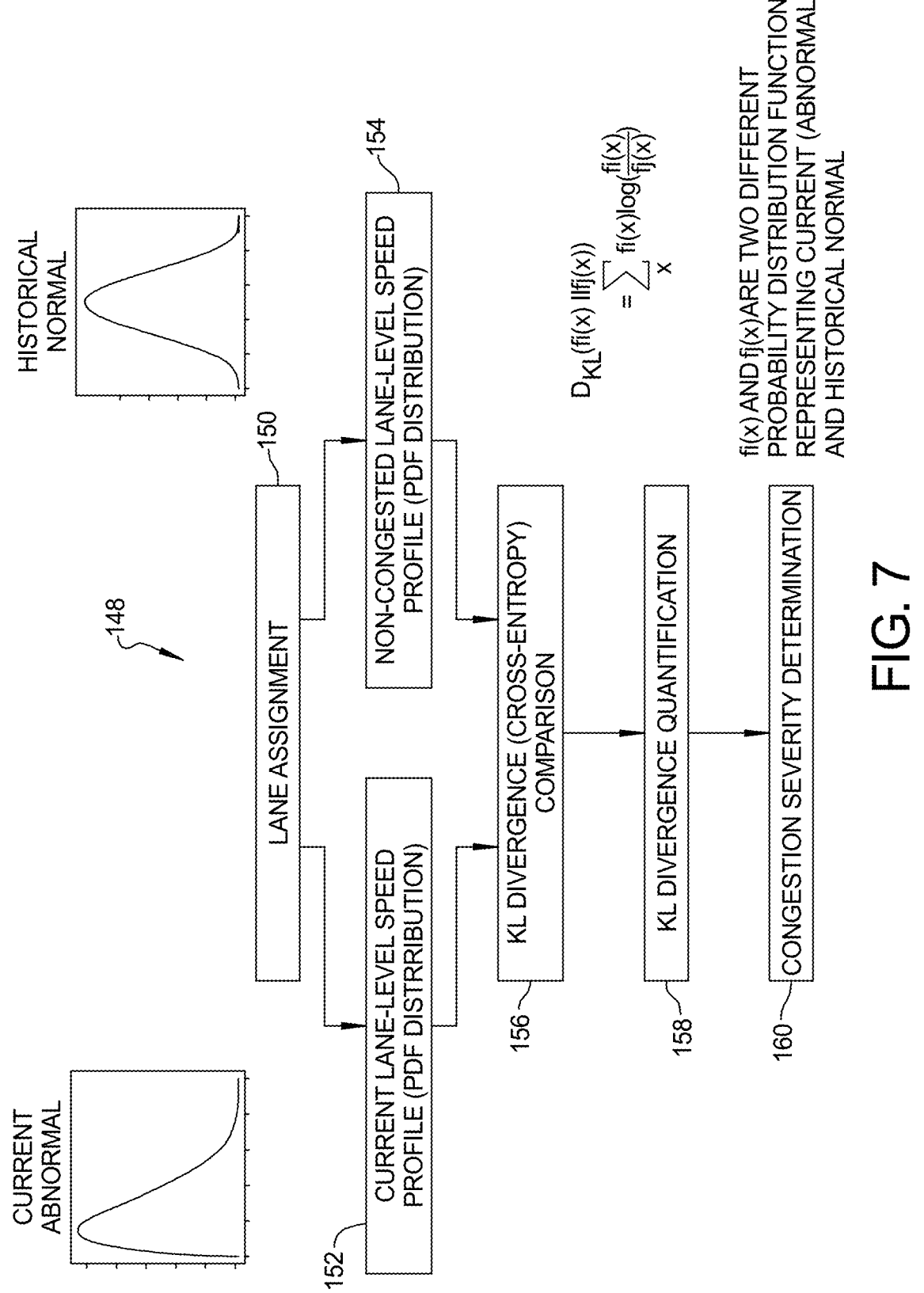

HISTORICAL NORMAL

CURRENT ABNORMAL

148

150 LANE ASSIGNMENT

154 NON-CONGESTED LANE-LEVEL SPEED PROFILE (PDF DISTRIBUTION)

152 CURRENT LANE-LEVEL SPEED PROFILE (PDF DISTRRIBUTION)

156 KL DIVERGENCE (CROSS-ENTROPY) COMPARISON

158 KL DIVERGENCE QUANTIFICATION

160 CONGESTION SEVERITY DETERMINATION $$D_{KL}(fi(x) \| fj(x)) = \sum_{x} fi(x)\log\left(\frac{fi(x)}{fj(x)}\right)$$

fi(x) AND fj(x) ARE TWO DIFFERENT PROBABILITY DISTRIBUTION FUNCTIONS REPRESENTING CURRENT (ABNORMAL) AND HISTORICAL NORMAL

FIG. 7

METHOD AND SYSTEM OF LANE-LEVEL ROAD CONGESTION IDENTIFICATION AND FORECASTING FOR NAVIGATION APPLICATION

The present disclosure relates to autonomous vehicle navigation and control systems.

High fidelity lane congestion indicators are needed for many autonomous vehicle (AV) applications such as optimal lane selection over the course of a trip including to facilitate exit from a controlled access road or freeway. Present systems assess road network congestion but lack lane traffic distribution information to identify lane congestion in high fidelity.

Thus, while current systems and methods for autonomous vehicle navigation achieve their intended purpose, there is a need for a new and improved system and method to identify lane-level road congestion.

SUMMARY

According to several aspects, a method to identify lane-level road congestion comprises: modeling a lane-level congestion evolution process as a 2-dimensional (2D) Markov chain having multiple vehicles moving through a predetermined segment of a road through horizontally and vertically adjacent road segments; aggregating a volume of the multiple vehicles over a predetermined unit of time moving through the predetermined segment; populating a lane congestion map identifying individual road lanes having differing levels of congestion; predicting a lane congestion map output and a lane congestion model output to a lane routing engine; and identifying routes and route changes for a host vehicle to apply to improve a host vehicle estimated time of arrival (ETA) at a predetermined finish location.

In another aspect of the present disclosure, the method further includes modeling lane level transition states through the use of Markov chains.

In another aspect of the present disclosure, the method further includes: performing a 2D Markov chain dimension reduction; converting the 2D Markov chain to a one-dimensional (1D) Markov chain; and conducting an error determination to identify if the 1D Markov chain is satisfied; and generating an error $\varepsilon$ less than a predetermined percentage error.

In another aspect of the present disclosure, the method further includes performing a 1D transition matrix generation if a 1D Markov chain error is satisfied, or repeating a determination of the 1D Markov chain error if the 1D Markov chain error is not satisfied.

In another aspect of the present disclosure, the method further includes splitting the 1D transition matrix to form an iterative steady state estimation when the 1D Markov chain error is satisfied.

In another aspect of the present disclosure, the method further includes: operating on the 1D transition matrix using a first iterative step applying a Jacobi iterative method to solve the 1D transition matrix; and identifying a system steady state estimation after the 1D matrix is solved.

In another aspect of the present disclosure, the method further includes: operating on the 1D transition matrix using a first iterative step applying a Gauss-Seidel method.to solve the 1D transition matrix; and identifying a system steady state estimation after the 1D transition matrix is solved.

In another aspect of the present disclosure, the method further includes applying arrival and dissipative rates of vehicle motion to identify impacts of a behavior of individual ones of the multiple vehicles within the segment of the road while considering the vertically and horizontally adjacent road segments.

In another aspect of the present disclosure, the method further includes identifying individual ones of the multiple vehicles having differing levels of congestion, including non-congested lanes, busy or heavy traffic lanes and one or more congested lanes wherein traffic is stopped or slowed to a predetermined minimal speed.

In another aspect of the present disclosure, the method further includes: predicting total lane change count maneuvers made by the host vehicle until the predetermined finish location is reached; and conducting a trade-off analysis between minimizing the ETA of the host vehicle to the predetermined finish location and minimizing total lane change count maneuvers to maximize a predetermined vehicle user comfort.

According to several aspects, a method to identify lane-level road congestion comprises: developing a high-volume GPS trajectory trace set for vehicles traversing a predetermined segment of a road; conducting Gaussian mixture modeling (GMM) on the high-volume GPS trajectory trace set; applying information to assist the GMM including a quantity of vehicle lanes applied; performing an expectation maximization procedure to assist identification of a data convergence; comparing a Gaussian component due to GPS error to curves depicting a mixture of different Gaussian components; and isolating and distinguishing the Gaussian component from an overall Gaussian distribution.

In another aspect of the present disclosure, the method further includes performing a convergence test to identify individual vehicle traces.

In another aspect of the present disclosure, the method further includes: identifying a lane assignment for the individual vehicle traces; and accumulating a current speed profile of the vehicles traveling in one of the vehicle lanes.

In another aspect of the present disclosure, the method further includes comparing the current speed profile to a known, non-congested speed profile to determine if a current condition of the predetermined segment of any one of the vehicle lanes defines a congested condition or a non-congested condition.

In another aspect of the present disclosure, the method further includes performing a lane assignment for the individual vehicle traces.

In another aspect of the present disclosure, the method further includes: performing a first profile step to identify a distribution of a current lane-level speed; conducting a second profile step in parallel with the first profile step to identify a distribution of a non-congested lane-level speed; and comparing outputs from the first profile step and the second profile step.

In another aspect of the present disclosure, the method further includes quantifying individual lanes of the road having a lateral distribution providing a Gaussian component due to GPS error and identifying an overall lateral distribution defining a mixture of multiple Gaussian components.

According to several aspects, a method to identify lane-level road congestion comprises: determining a volume of vehicles over a predetermined unit of time moving through a predetermined segment of a road; performing a lane assignment for individual vehicle traces of individual ones of the volume of vehicles; accumulating a current speed profile of the multiple vehicles traveling in one of the multiple lanes of the road; comparing the current speed profile to a known, non-congested speed profile to determine if a current condition of the predetermined segment of any one of the multiple lanes defines a congested condition or a non-congested condition; and generating visual indications of road image portions of the predetermined segment for presentation to an operator of a host vehicle identifying one of the congested condition or a non-congested condition.

In another aspect of the present disclosure, the method further includes: obtaining a range of divergence values in terms of the speed profile; and establishing values of divergence congestion severity in the terms of the speed profile.

In another aspect of the present disclosure, the method further includes varying one of a line width and a color of one of the road image portions to distinguish between the values of divergence congestion severity.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a flow diagram of steps to determine a congestion severity;

DETAILED DESCRIPTION

The following description is merely exemplary in nature and is not intended to limit the present disclosure, application, or uses.

Figure 1:
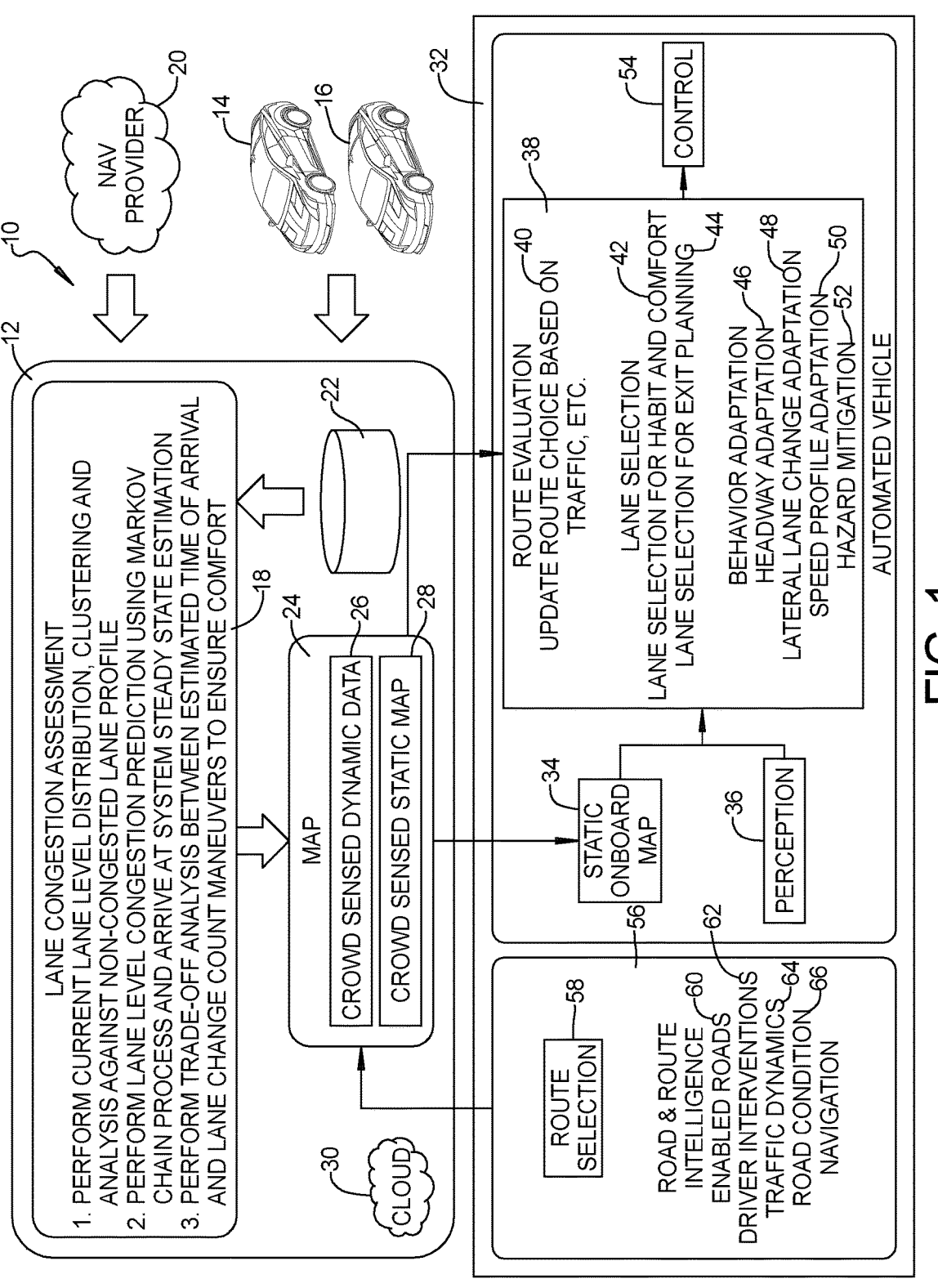
FIG. 1 is a system diagram of a method for lane level road congestion identification and forecasting for vehicle navigation according to an exemplary aspect.

Referring to FIG. 1, a method for lane level road congestion identification and forecasting for vehicle navigation 10 is divisible into two sections. In a first section 12 located for example in a cloud computing network, large volumes of vehicle data are collected and analyzed to assess if vehicle roadway lane congestion is occurring ahead of a first or host vehicle 14, which according to several aspects defines an autonomous vehicle (AV), and at least one second vehicle 16 which may define a lead actor vehicle ahead of the host vehicle 14. In an assessment portion 18, three performance evaluations are obtained. Data required for conducting the assessment portion 18 may be provided by a navigation provider 20 which may contain roadway status, routing status and global positioning system (GPS) data. Calculations performed during the assessment portion 18 may be performed using a computer 22, which may by located in the cloud-based system or in the host vehicle 14. As used herein, a road includes a single lane or a multiple lane highway, a street, a lane or the like for vehicle travel.

During a first of the three performance evaluations, an analysis is conducted of a current lane level distribution of multiple vehicles in front of or proximate to the host vehicle 14, together with a vehicle clustering assessment of at least one vehicle lane forward of the host vehicle 14. Results of the first performance evaluation are compared to a non-congested vehicle lane profile to distinguish lane level distribution of the vehicles in front of or proximate to the host vehicle 14.

During a second of the three performance evaluations a lane level congestion prediction is performed which may be made using a process such as a Markov Chain process. The lane level congestion prediction is performed to determine a system steady state estimation.

During a third of the three performance evaluations of the assessment portion 18, a trade-off analysis is conducted providing an estimated time of arrival (ETA) of the host vehicle 14 to a predetermined destination which includes predicting total lane change count maneuvers made by the host vehicle 14 until the ETA is reached. The total lane change maneuvers are applied to ensure a predetermined vehicle user comfort is maintained during host vehicle travel which is described in greater detail herein.

Control of the method for lane level road congestion identification and forecasting for vehicle navigation 10 may be performed using an individual device such as a processor, a software component, an onboard computer or a remote located computer, hereinafter collectively referred to as the computer 22. The computer 22 may be deployed in the host vehicle 14 with perception capabilities or may be remotely located. The computer 22 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Results of the above three performance evaluations are forwarded to a map 24. The map 24 may include crowd sensed dynamic data 26 and a crowd sensed static map 28. Data collected or generated by the first system section 12 may be stored in and retrieved from a cloud computing network 30.

Following generation and collection of data by the first system section 12, additional analyses are performed by a second system section 32 which is located in the host vehicle 14. The first system section 12 communicates data with the second system section 32. For example, data from the crowd sensed static map 28 is communicated to a vehicle lane static onboard map 34. An output of a perception module 36 collecting data using sensors of the host vehicle 14 for example, and the crowd sensed dynamic data 26 together with requested data of the static onboard map 34 are together forwarded to an evaluation and selection module 38. The evaluation and selection module 38 also receives requested data from the map 24.

The evaluation and selection module 38 performs several functions. A first function of the evaluation and selection module 38 defines a route evaluation 40 wherein a route choice based on detected traffic is updated. A second function of the evaluation and selection module 38 defines first and second lane selection functions including a first lane selection function 42 wherein a travel lane of the host vehicle 14 is selected based on both saved or input habits of the user or passengers of the host vehicle 14 and a comfort level of the operator of the host vehicle 14 is selected. In a second lane selection function 44 a lane selection is developed based on planning data developed to prepare to exit the host vehicle 14 at an upcoming road exit. A third function of the evaluation and selection module 38 defines behavior adaptations including a headway adaptation 46, a lateral lane change adaptation 48, a speed profile adaptation 50 and a hazard mitigation 52. Data collected or analyzed by the second system section 32 is forwarded as vehicle control instructions to a vehicle control module 54.

Also provided in the method for lane level road congestion identification and forecasting for vehicle navigation 10 is a vehicle navigation system 56 in communication with map 24. The vehicle navigation system 56 provides a route selection module 58 to identify data available routes selected for the operator of the host vehicle 14 and which allows the operator to select preferred routes. This data of the route selection module 58 also includes data identified relative to enabled roads 60 defining roads which are available for vehicle travel, driver interventions 62 which identify to the operator of the host vehicle 14 when and if for example a driver takeover of operation of the automated vehicle defining the host vehicle 14 may be required, traffic dynamics 64 to provide up-to-date changes occurring on the road including for example accident reports, and road conditions 66 which provide up-to-date changes to road conditions which may occur for example due to weather conditions and the like.

Referring to FIG. 2 and again to FIG. 1, a system block diagram 68 provides portions of the method to incorporate lane level road congestion to enhance vehicle navigation 10 in a cloud computing network 70 and within a vehicle 72 such as the host vehicle 14. Within the cloud computing network 70 a data ingestion module 74 collects system sensor data including third party traffic data 76. A first output of the data ingestion module 74 is directed to a lane congestion model 78. The lane congestion model 78 may also receive data from a base map 80. A second output of the data congestion module 78 is directed to a data aggregation module 82 and an output of the data aggregation module 82 is directed to a lane congestion map 84 which identifies individual road lanes having differing levels of congestion, including non-congested lanes, busy or heavy traffic lanes and one or more congested lanes wherein traffic may be stopped or slowed to a minimal speed for example when slowing to force vehicles into fewer lanes such as at construction zones. An output of the lane congestion map 84 is directed to a lane routing engine 86 and an output of the lane congestion model 78 is also directed to the lane routing engine 86. The lane routing engine 86 identifies possible routes and route changes for the host vehicle 14 to apply to improve the vehicle ETA.

Figure 2:
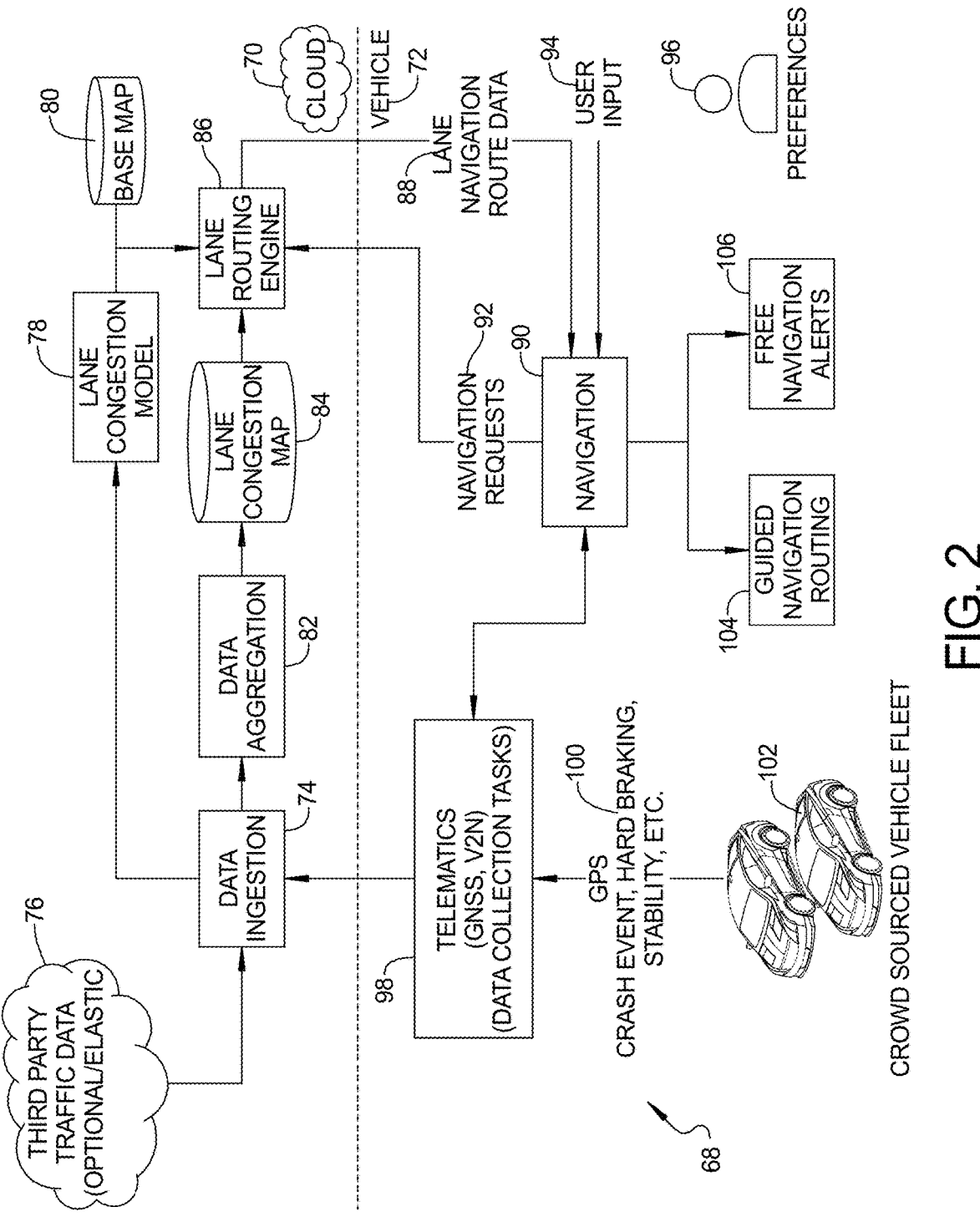
FIG. 2 is a system block diagram for the method of FIG. 1.

With further reference to FIG. 2, data is exchanged between the cloud computing network 70 and the vehicle 72, for example by wireless data transmission. Components of the vehicle 72 are hereinafter identified, together with information and data exchanges with the cloud computing network 70. For example, an output of the lane routing engine 86 defining lane navigation route data 88 is forwarded to a navigation module 90. Navigation requests 92 are forwarded from the navigation module 90 to the lane routing engine 86 and may be returned as the lane navigation route data 88. The navigation module 90 also receives user input 94 provided by a vehicle user 96 or operator.

The vehicle 72 further includes a telematics module 98 which may communicate via a global navigation satellite system (GNSS) and using vehicle-to-network (V2N) communication protocols with the navigation module 90. The telematics module 98 is responsible in part to perform data collection tasks. For example, the telematics module 98 may receive GPS data, crash event data, hard braking data and stability data, all collectively defining vehicle data 100 from a crowd sourced vehicle fleet 102. An output of the navigation module 90 may also define guided navigation routing information 104 and free navigation alerts 106.

Figures 3, 4:
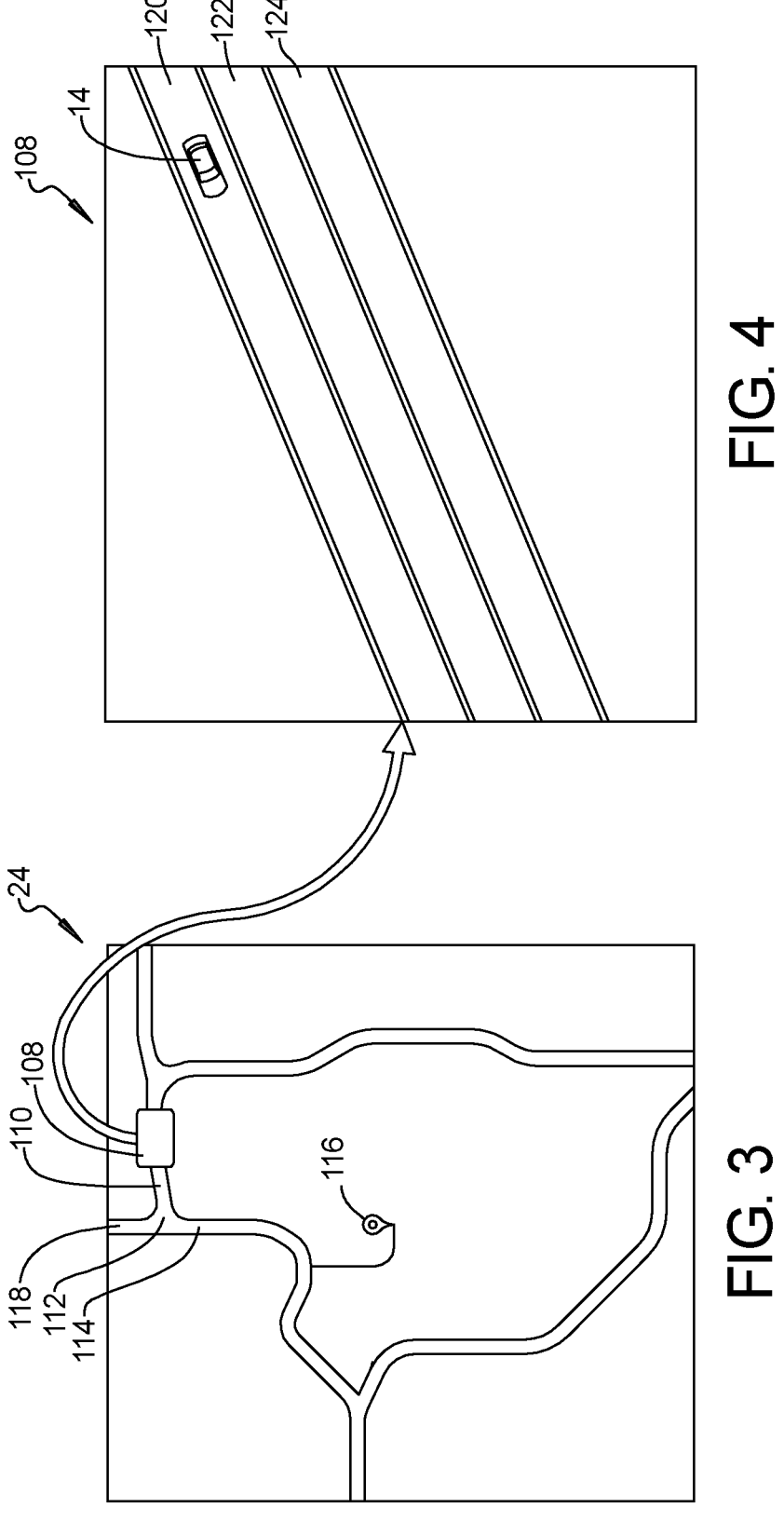
FIG. 3 is a plan view of a map for the method of FIG. 1.
FIG. 4 is an expanded view of a segment of a road of FIG. 4.

Referring to FIG. 3, an initial presentation of the map 24 is identifies lane-level congestion using the method for lane level road congestion identification and forecasting for vehicle navigation 10. Traffic volumes and speeds are collected such as by using the telematics module 98 discussed in reference to FIG. 2. The determination of lane-level congestion is divided into multiple components, defining for example a component A providing lane-level congestion identification and a component B providing lane-level congestion prediction.

For component A, lane-level congestion data is initially collected at a 3D level, having a measured volume of vehicles identified in part using the third-party traffic data 76, the telematics module 98, together with GPS traffic data and data from multiple similar sources. The volume of vehicles is determined over a predetermined unit of time such as per a five (5) minute time period moving through a predetermined segment 108 of a road 110. According to several aspects, the predetermined segment 108 may have a length of approximately 500 meters. The volume of vehicles passing beyond the predetermined segment 108 will disperse over time. For example, upon reaching a road interchange 112 a first portion of the vehicles will turn onto a first road segment 114 heading toward a host vehicle finish location 116 and a second portion of the vehicles will turn onto a second road segment 118 heading away from the finish location 116. One or multiple connecting streets also may be accessed for the host vehicle 14 to turn onto from the first road segment 114 to reach the finish location 116.

Lane-level congestion may occur within the predetermined segment 108 and between the predetermined segment 108 and the road interchange 112, as well as in either or both of the first road segment 114 or the second road segment 118 and in the one or more connecting streets leading to the finish location 116. An operator of the host vehicle 14 may not be able to visually identify where the lane-level congestion is occurring, or to estimate a change in the ETA of the host vehicle 14. The method for lane level road congestion identification and forecasting for vehicle navigation 10 therefore provides data to the operator to help the operator determine if the host vehicle 14 should continue to travel on the initial route toward the finish location 116, or to exit the road 110 currently in use.

Referring to FIG. 4, in an exemplary aspect the predetermined segment 108 provides three lanes including a first lane 120, a second lane 122 and a third lane 124. In an exemplary configuration the host vehicle 14 is presented in the first lane 120. Vehicle traffic may be congested in any or all of the three lanes, and the method for lane level road congestion identification and forecasting for vehicle navigation 10 provides data to the operator or an automatic control system of the host vehicle 14 to identify if the host vehicle 14 should remain in the first lane 120 or move into the second lane 122 or the third lane 124. The method for lane level road congestion identification and forecasting for vehicle navigation 10 also provides data for the operator or the automatic control system of the host vehicle 14 to exit the host vehicle 14 if a non-congested path improving the ETA of the host vehicle 14 is available off of the road 110.

Referring to FIG. 5 and again to FIG. 4, a graph 126 presents a comparison of a Gaussian component due to GPS error and curves depicting a mixture of different Gaussian components. The individual lanes such as the first lane 120 have a lateral distribution providing a Gaussian component due to GPS error identified by a first curve 128, and an overall lateral distribution defines a mixture of different Gaussian components which are depicted in a second curve 130. The Gaussian component identified in the first curve 128 is isolated and distinguished from the overall Gaussian distribution depicted by the second curve 130 applying equation 1 below.

$$P(x) = \sum_{k=1}^{K} \pi_k N(x \mu_k, \Sigma_k) \qquad \text{Equation 1}$$

$$K: \pi_k \geq 0 \sum_{k=1}^{K} \pi_k = 1$$

Figure 5:
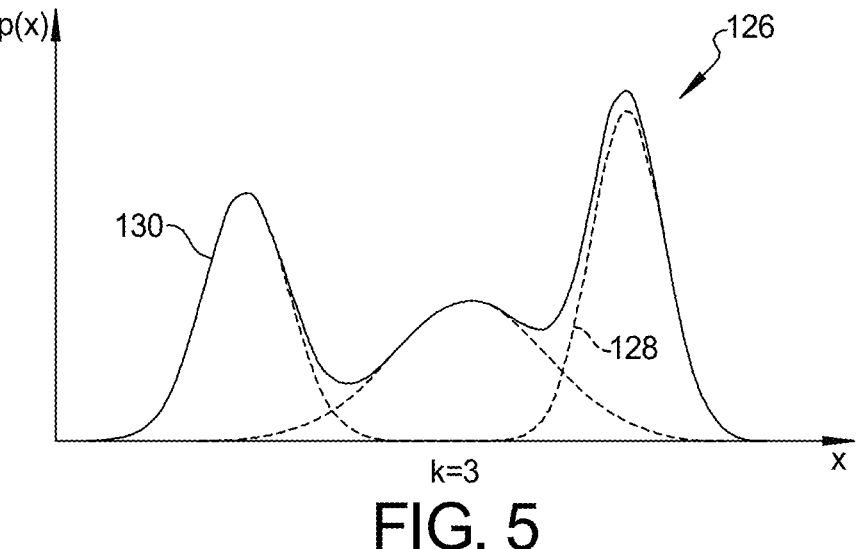
FIG. 5 is a graph presenting a comparison of a Gaussian component due to GPS error and curves depicting a mixture of different Gaussian components.

Referring to FIG. 6 and again to FIGS. 4 and 5, a flow diagram 132 presents steps to distinguish the Gaussian components described in reference to FIG. 5 includes a first step 134 wherein a high-volume GPS trajectory trace set is developed for the vehicles traversing the predetermined segment 108. In a second step 136 Gaussian mixture modeling (GMM) is performed on the high-volume GPS trajectory trace set. In a third step 138 prior information to assist the GMM including features such as a quantity of vehicle lanes is applied. In a fourth step 140 an expectation maximization procedure is performed to assist identification of convergence of the data. In a fifth step 142 a convergence test is performed to identify individual vehicle traces. If a response to the convergence test is NO 144, the program returns to the fourth step 140. If a response to the convergence test is YES 146 the program continues as described in reference to FIG. 7.

Figure 6:
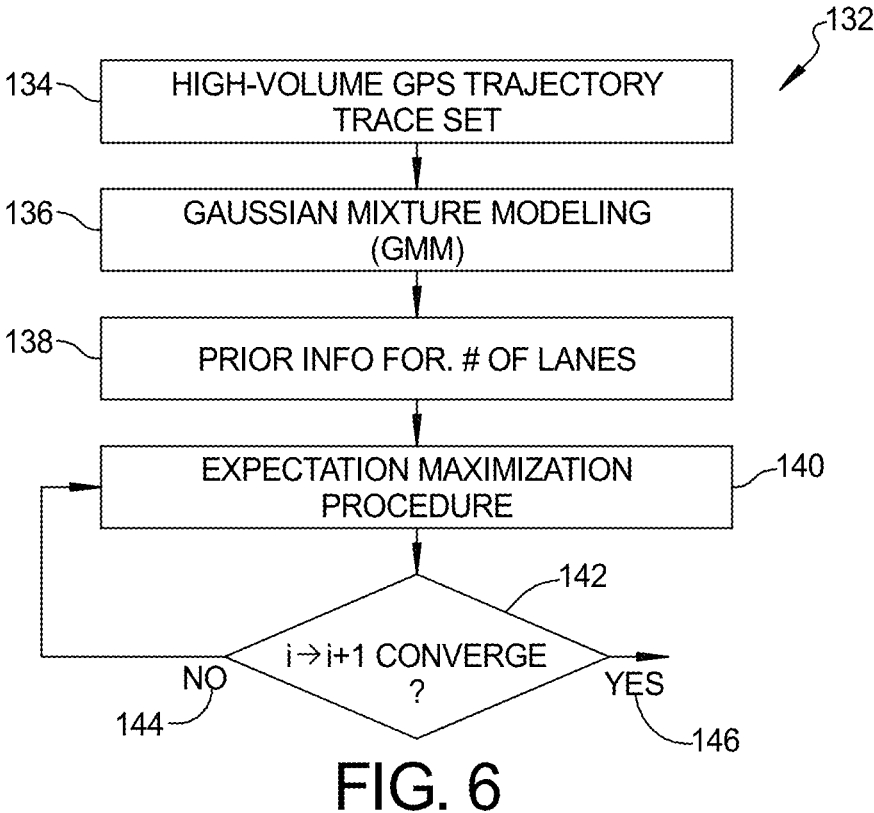
FIG. 6 is a flow diagram presenting steps to distinguish the Gaussian components described in reference to FIG. 5.

Referring to FIG. 7 and again to FIGS. 4 through 6, a flow diagram 148 identifies steps that are applied to quantify lane-level congestion. Once a lane assignment for individual vehicle traces is accomplished, a current speed profile of the vehicles traveling in any particular lane of the road 110 is accumulated. The current speed profile is compared to a known, non-congested speed profile to determine if the current condition of the predetermined segment 108 defines a congested condition or a non-congested condition. In an assignment step 150 a lane assignment for individual vehicle traces is performed. In parallel, a first profile step 152 is performed to identify a distribution of a current lane-level speed and a second profile step 154 is performed to identify a distribution of a non-congested lane-level speed is performed. Outputs from the first profile step 152 and the second profile step 154 are compared in a divergence step 156 applying Equation 2 below. For equation 2, $f_i(x)$ and $f_j(x)$ are two different probability distribution functions representing a current abnormal distribution and an historical normal distribution.

$$D_{KL}\big(f_i(x)//f_j(x)\big) = \sum_{x} f_i(x) \log_{\frac{(f_i(x))}{f_j(x)}} \qquad \text{Equation 2}$$

Figure 8:
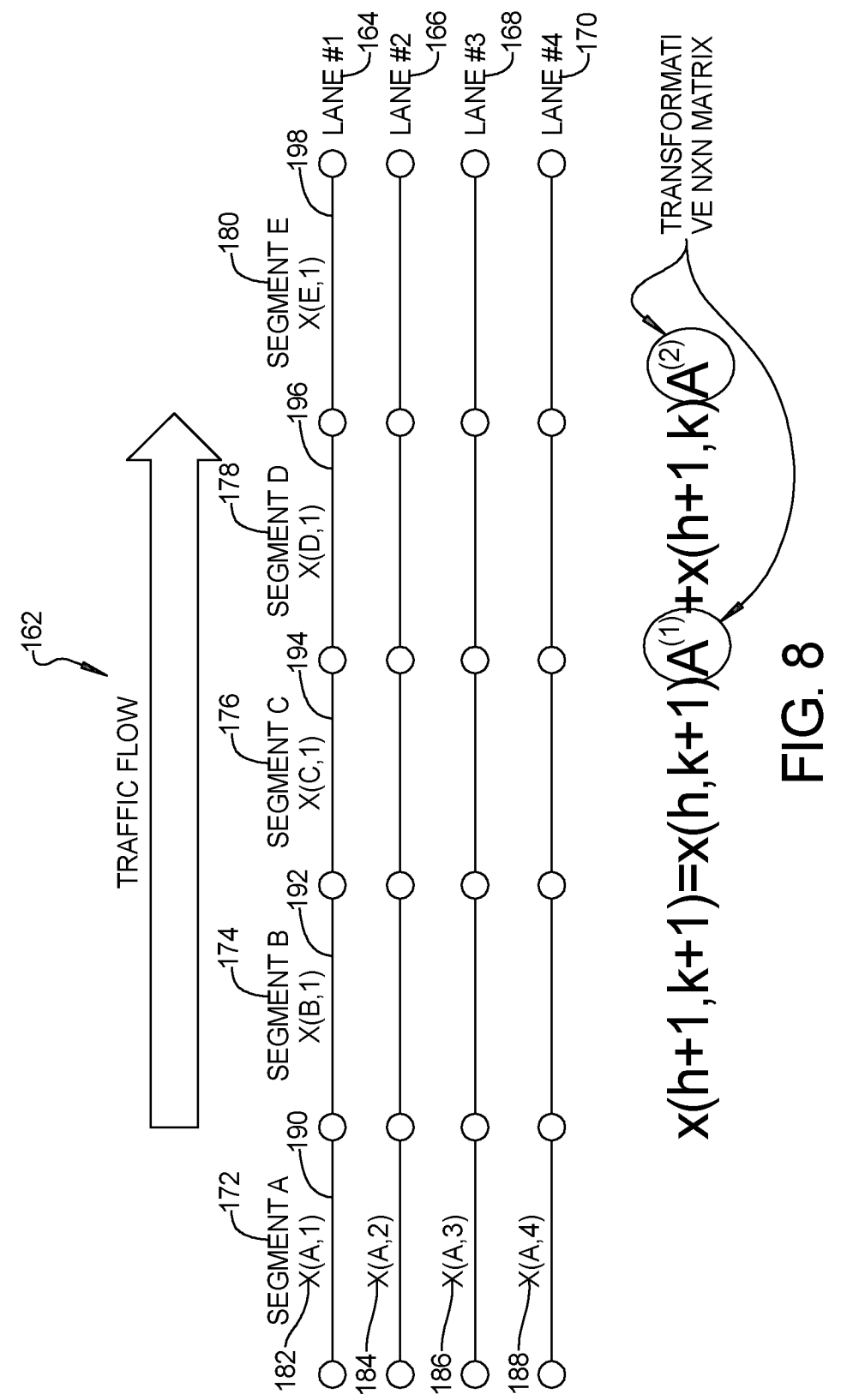
FIG. 8 is a diagram of a segment of a road for the method of FIG. 1.

In a following divergence quantification step 158 a level or a range of divergence values are obtained. In a following congestion severity determination step 160 values of divergence may be established which allow a visual presentation to the operator of the host vehicle 14. For example, a first range of divergence values may be 0 to 20, a second range may be 20 to 40, a third range may be 40 to 60, a fourth range may be 60 to 80 and a fifth range may be 80 to 100. Each range may be presented in a diagram of a road segment described in greater detail in reference to FIG. 8.

Referring to FIG. 8 and again to FIGS. 6 and 7, the ranges of divergence values identified in reference to FIG. 7 may be provided in a visual presentation. For example an exemplary road segment diagram 162 identifies how an exemplary road portion in the path of travel of the host vehicle 14 may be delineated. By applying the large volume of lane data and lane-level participation received and analyzed, lane-level congestion status may be provided for use by the operator of host vehicle 14 as well as the vehicle navigation system 56. An exemplary road may include a first lane 164, a second lane 166, a third lane 168 and a fourth lane 170. Each of the lanes is divisible into segments, which may include a first or A segment 172, a second or B segment 174, a third or C segment 176, a fourth or D segment 178 and a fifth or E segment 180.

The individual segments of the collection of lanes may be further designated, such as the first or A segment 172 of the first lane 164 may be assigned a designation 182 defined as X(A,1), the first or A segment 172 the second lane 166 may be assigned a designation 184 defined as X(A,2), the first or A segment 172 the third lane 168 may be assigned a designation 186 defined as X(A,3), and the first or A segment 172 the fourth lane 170 may be assigned a designation 188 defined as X(A,4).

Visual indications of road segment congestion may be provided to the operator of the host vehicle 14. For example, the first or a segment 172 of the first lane 164 may be presented as a lane segment 190 having a first color or line width indicating a non-congested condition, the second or B segment 174 of the first lane 164 may be presented as a lane segment 192 having a second color or line width indicating an increased congestion condition, the third or C segment 176 of the first lane 164 may be presented as a lane segment 194 having the second color or line width modified to indicate the increased congestion condition, the fourth or D segment 178 of the first lane 164 may be presented as a lane segment 196 having a third color or line width indicating a congested condition and the fifth or E segment 180 of the first lane 164 may be presented as a lane segment 198 having the third color or a modified color or line width indicating the congested condition. The host vehicle 14 may automatically adjust a driving path or the operator of the host vehicle 14 may manually adjust the vehicle driving path in view of the visual indications provided by the road segment diagram 162.

Referring to FIG. 9 and again to FIGS. 1 through 8, as noted above the determination of lane-level congestion is divided into multiple components, defining the component A discussed above in reference to FIGS. 3 through 8 providing lane-level congestion identification and component B providing lane-level congestion prediction. With respect to component B providing lane-level congestion prediction, the lane-level congestion evolution process is modeled as a 2-dimensional (2D) Markov chain 200 to study the formation, propagation and evolution of road congestion at the lane-level. A vertical dimension of a lane number is X (h, *). A horizontal dimension of a road segment number is X (*, k). A state of each local cell X (h+1, k+1) is determined by its nearest neighbor such as X (h, k+1) for a horizontal neighbor and X (h+1, k) for a vertical neighbor.

Figure 9:
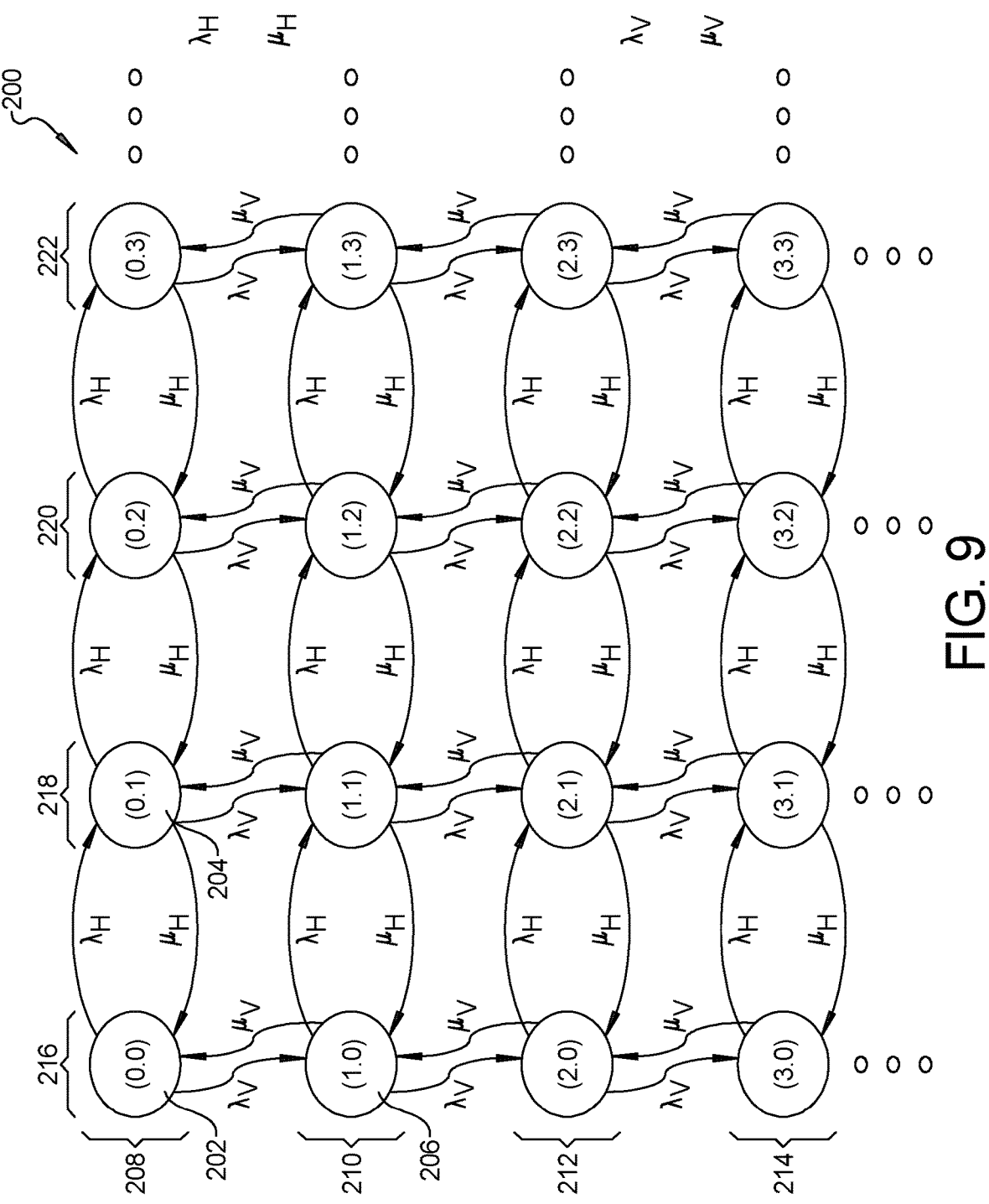
FIG. 9 is a diagram defining a lane-level congestion evolution process modeled as a 2-dimensional (2D) Markov chain.

FIG. 9 may be used to predict how the behavior of vehicles in the same road segment such as the predetermined segment 108 impact the host vehicle 14 and in turn how the behavior of the host vehicle 14 impacts the other vehicles in the road segment. For example, vehicle speeds vary over time, a frequency of vehicle lane changes varies and all of the vehicles including the host vehicle 14 are impacted by lane-level congestion, both directly in front of and to the sides of the vehicle such as the host vehicle 14, and as lane-level congestion slows or stops vehicle travel in any or all of the lanes.

In the example of FIG. 9 a four-lane road is presented. A first vehicle 202 defining for example the host vehicle 14 is positioned to the left as viewed in FIG. 9 of a second vehicle 204, or horizontally with respect to the first vehicle 202. A third vehicle 206 is positioned vertically with respect to the first vehicle 202 and may for example be directly in front of the first vehicle 202. Multiple vehicles are arranged in successive horizontal rows defining a first horizontal row 208, a second horizontal row 210, a third horizontal row 212 and a fourth horizontal row 214. Vertical rows representing individual lanes of a four lane road define a first vertical row 216, a second vertical row 218, a third vertical row 220 and a fourth vertical row 222.

Arrival and dissipative rates of vehicle motion are used to identify impacts of individual vehicle behavior within an identified segment of the road. For the horizontal rows, $\lambda_H$ is the arrival rate from x(h, k) to x (h, k+1) and $\mu_H$ is a dissipative or service rate from x(h,k+1) back to x(h,k). For the vertical rows, $\lambda_V$ is the arrival rate from x(h, k) to x (h+1, k) and $\mu_V$ is the dissipative (service) rate from x(h+1,k) back to x(h,k).

Figure 10:
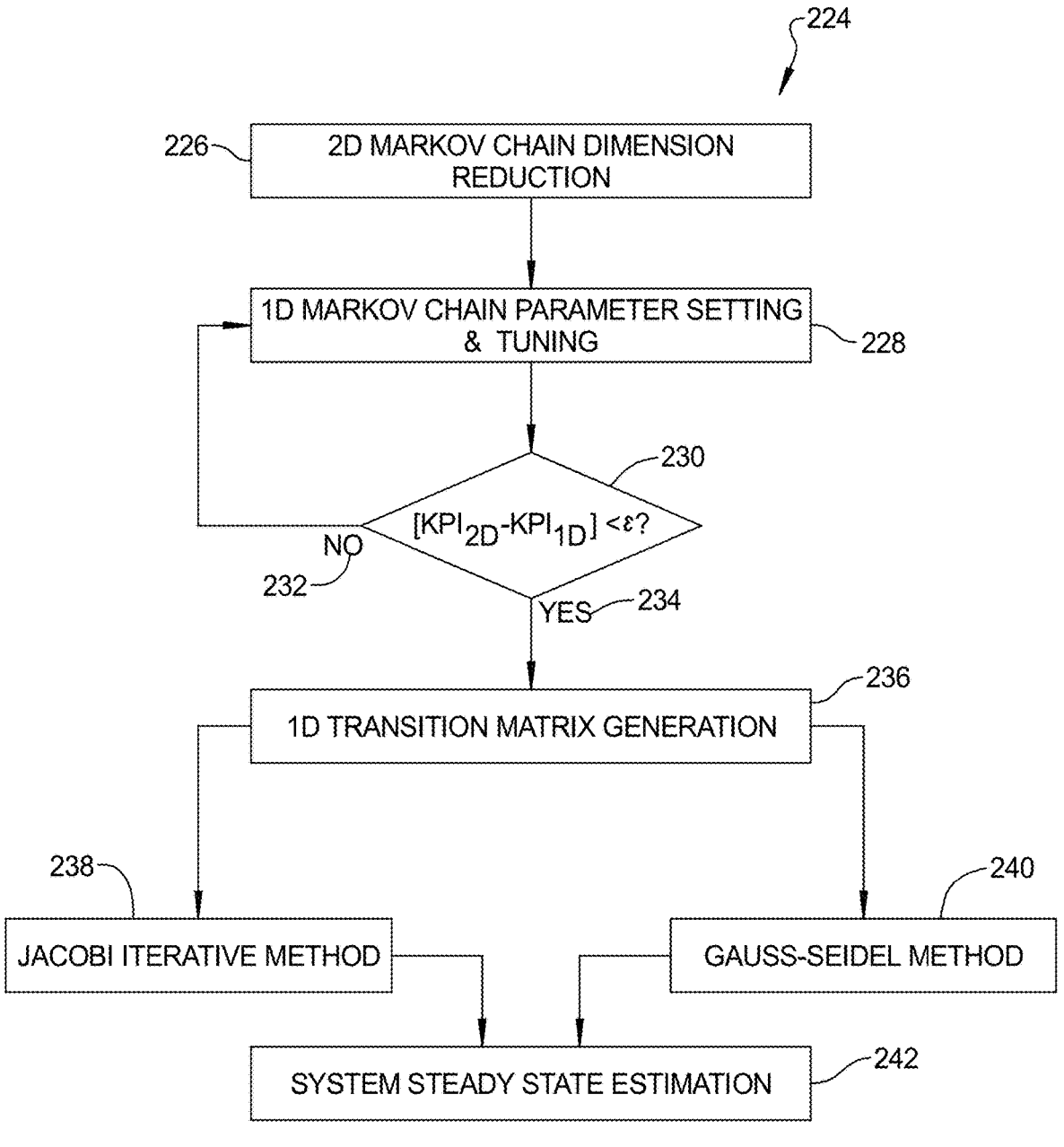
FIG. 10 is a flow diagram defining steps to reduce complexity and dimensionality of data used by the method of FIG. 1.

Referring to FIG. 10, a flow diagram 224 provides steps to reduce a complexity and dimensionality of the data used by the method for lane level road congestion identification and forecasting for vehicle navigation 10 to determine a system steady state estimation. Initially, in a reduction step a 2D Markov chain dimension reduction is performed. In a next setting and tuning step 228 the 2D Markov chain is converted to a one-dimensional (1D) Markov chain to reduce a dimensionality of, or to approximate a high-order Markov chain into a simple 1D Markov chain. An error determination step 230 is then performed. During the error determination step 230, if the 1D Markov chain reconstructed in the setting and tuning step 228 is not satisfied 232, for example generating error 6 greater than for example a 5% error, the program returns to the setting and tuning step 228 for calibration until the 1D Markov chain is satisfied.

If the 1D Markov chain error is satisfied 234, a 1D transition matrix generation step 236 is performed. The 1D transition matrix is then split and to form an iterative steady state estimation. The 1D transition matrix may be operated on using either a first iterative step 238 applying the Jacobi iterative method or using a second iterative step 240 applying the Gauss-Seidel method. Either of two approaches may be applied. After the 1D matrix is solved, in a final estimation step 242 a system steady state estimation is identified.

With continuing reference to FIG. 10, in the first iterative step 238 applying the Jacobi iterative method a transition matrix A may be split as follows:

$$A^T = D - (L + U)$$

$$P = D$$

$$Q = L + U$$

For the Jacobi iterative method an Iterative steady state estimation and its scalar form are:

$$x^{(k+1)} = D^{-1}(L + U)x^{(k)}$$

$$x_i^{(k+1)} = 1/d_{ii}\left(\sum_{j=1}^{i-1} l_{ii}x_j^{(k)} + \sum_{j=i+1}^{n} u_{ij}x_j^{(k)}\right)$$

In the second iterative step 240 applying the Gauss-Seidel method a transition matrix A could be split as:

$$A^T = (D - L) - U$$

$$P = D - L$$

$$Q = U$$

For the Gauss-Seidel method an iterative steady state estimation and its scalar form are:

$$x^{(k+1)} = (D - L)^{-1} Ux^{(k)}$$

$$x_i^{(k+1)} = 1/d_{ii}\left(\sum_{j=1}^{i-1} l_{ii}x_j^{(k+1)} + \sum_{j=i+1}^{n} u_{ij}x_j^{(k)}\right)$$

According to several aspects, the system and method of the present disclosure provides vehicle telemetry data used to identify, track and predict road network congestion. A Gaussian mixture model is used to determine a lane-level congestion estimation under potential GPS error scenarios. A 2D Markov chain is used to predict a lane-level congestion evolution and applies a 1D Markov model to approximate the 2D Markov chain through dimension reduction.

A method for lane level road congestion identification and forecasting for vehicle navigation 10 of the present disclosure offers several advantages. These include a method and system leveraging a large volume of vehicle trajectory data, a lane-level road congestion identification and a forecast mechanism using (1) Gaussian mixture model and (2) 2D Markov process. The lane-level congestion level is used to provide assistance to AV navigation.

Vehicle telemetry data is used to identify, track and predict road network congestion. The Gaussian Mixture Model (GMM) algorithm is applied along with an Expectation Maximization algorithm to achieve lane-level partitioning. A 2D Markov chain algorithm is used to forecast the evolution of lane-level congestion along segments of a road. A dimensionality reduction method converts the 2D Markov process to a 1D Markov chain, for steady-state probability distribution. The system and method of the present disclosure provide a concept of using lane-level congestion and comfort measures to assist AV navigation decisions.

What is claimed is:

1. A method for lane-level road congestion identification and forecasting, comprising:
   identifying lane-level road congestion comprising the steps of:
      developing a high-volume GPS trajectory trace set for vehicles traversing the predetermined segment of a road;
      conducting Gaussian mixture modeling (GMM) on the high volume GPS trajectory trace set;
      applying information to assist the GMM including a quantity of vehicle lanes of the predetermined segment of the road;
      performing an expectation maximization procedure to assist identification of a data convergence;
      comparing a Gaussian component due to GPS error to curves depicting a mixture of different Gaussian components; and
      isolating and distinguishing the Gaussian component from an overall Gaussian distribution; and
   predicting lane-level road congestion comprising the steps of:
      modeling a lane-level congestion evolution process as a 2-dimensional (2D) Markov chain having multiple vehicles moving through a predetermined segment of a road through horizontally and vertically adjacent road segments;
      aggregating a volume of the multiple vehicles over a predetermined unit of time moving through the predetermined segment;
      populating a lane congestion map identifying individual road lanes having differing levels of congestion;
      predicting a lane congestion map output and a lane congestion model output to a lane routing engine;
   identifying routes and route changes for a host vehicle and applying the route and route changes to improve a host vehicle estimated time of arrival (ETA) at a predetermined finish location such that the ETA is shorter than a predetermined threshold; and
   autonomously driving, via an automatic control system, the host vehicle along the identified routes and route changes.

2. The method of claim 1, further including modeling lane level transition states through the use of Markov chains.

3. The method of claim 2, further including:
   performing a 2D Markov chain dimension reduction;
   converting the 2D Markov chain to a one-dimensional (1D) Markov chain; and
   generating an error ε less than a predetermined percentage error.

4. The method of claim 3, further including determining a 1D Markov chain error is satisfied and performing a 1D transition matrix generation, or determining the 1D Markov chain error is not satisfied and repeating a determination of the 1D Markov chain error.

5. The method of claim 4, further including determining the 1D Markov chain error is satisfied and splitting the 1D transition matrix to form an iterative steady state estimation.

6. The method of claim 5, further including:
   operating on the 1D transition matrix using a first iterative step applying a Jacobi iterative method to solve the 1D transition matrix; and
   identifying a system steady state estimation after the 1D matrix is solved.

7. The method of claim 5, further including:
   operating on the 1D transition matrix using a first iterative step applying a Gauss-Seidel method to solve the 1D transition matrix; and
   identifying a system steady state estimation after the 1D transition matrix is solved.

8. The method of claim 1, further including applying arrival and dissipative rates of vehicle motion to identify impacts of a behavior of individual ones of the multiple vehicles within the segment of the road while considering the vertically and horizontally adjacent road segments.

9. The method of claim 8, further including identifying individual ones of the multiple vehicles having the differing levels of congestion, including non-congested lanes, busy or heavy traffic lanes and one or more congested lanes wherein traffic is stopped or slowed to a predetermined minimal speed.

10. The method of claim 1, further including:
   predicting total of lane change count maneuvers made by the host vehicle until the predetermined finish location is reached; and
   conducting a trade-off analysis between minimizing the ETA of the host vehicle to the predetermined finish location and minimizing the total of the lane change count maneuvers to maximize a predetermined vehicle user comfort.

11. The method of claim 1, wherein identifying lane-level road congestion further includes the step of performing a convergence test to identify individual vehicle traces.

12. The method of claim 11, further including:
   identifying a lane assignment for the individual vehicle traces; and
   accumulating a current speed profile of the vehicles traveling in one of the vehicle lanes.

13. The method of claim 12, further including comparing the current speed profile to a known, non-congested speed profile to determine if a current condition of the predetermined segment of any one of the vehicle lanes defines a congested condition or a non-congested condition.

14. The method of claim 11, further including performing a lane assignment for the individual vehicle traces.

15. The method of claim 14, further including:
   performing a first profile step to identify distributions of current lane-level speeds;
   conducting a second profile step in parallel with the first profile step to identify distributions of a non-congested lane-level speed; and
   comparing outputs from the first profile step and the second profile step.

16. The method of claim 1, wherein identifying lane-level road congestion further includes the steps of:
   determining a volume of vehicles over a predetermined unit of time moving through the predetermined segment of the road;
   performing a lane assignment for individual vehicle traces of individual ones of the volume of vehicles;
   accumulating a current speed profile of a portion of the volume of vehicles traveling in one of multiple lanes of the road;
   comparing the current speed profile to a known, non-congested speed profile to determine if a current condition of the predetermined segment of any one of the multiple lanes defines a congested condition or a non-congested condition; and generating visual indications of multiple road image portions of the predetermined segment for presentation to an operator of a host vehicle identifying one of the congested condition or a non-congested condition.

17. The method of claim 16, further including:

obtaining a range of divergence values in terms of the speed profile; and establishing values of divergence congestion severity in the terms of the speed profile.

18. The method of claim 17, further including varying one of a line width and a color of one of the multiple road image portions to distinguish between the values of divergence congestion severity.

* * * * *